Figure 1:
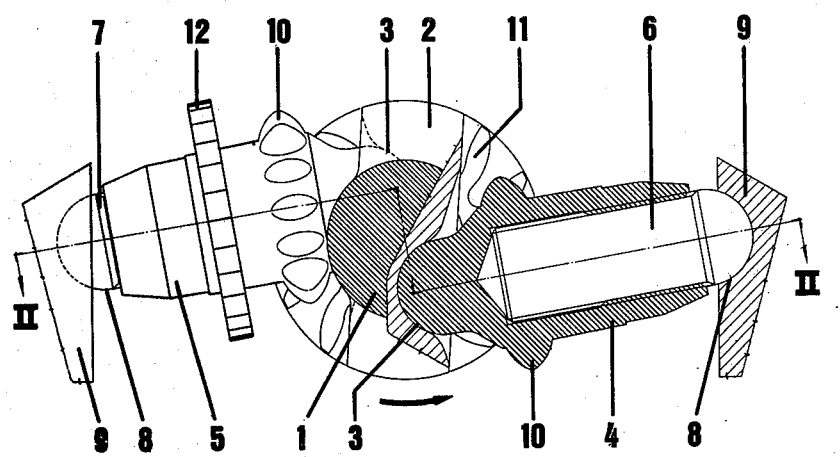

United States Patent [19]

Camph

[11] 4,161,999
[45] Jul. 24, 1979

[54] AUTOMATIC SLACK ADJUSTER

[75] Inventor: Sven E. Camph, Malmo, Sweden

[73] Assignee: Camph Engineering Company AB, Malmo, Sweden

[21] Appl. No.: 859,735

[22] Filed: Dec. 12, 1977

[30] Foreign Application Priority Data

Dec. 27, 1976 [SE] Sweden ............................... 7614550

[51] Int. Cl.² ............................................ F16D 65/56
[52] U.S. Cl. ...................... 188/196 BA; 188/79.5 GE
[58] Field of Search ................ 188/196 BA, 79.5 GE, 188/79.5 S, 79.5 GC, 79.5 K, 79.5 P; 192/111 A

[56] References Cited

U.S. PATENT DOCUMENTS

| 1,875,065 | 8/1932 | Lyman | 188/79.5 GC |
| 3,326,331 | 6/1967 | Wallace | 188/79.5 GE |
| 3,891,068 | 6/1975 | Camph | 188/79.5 GE X |

*Primary Examiner*—George E. A. Halvosa
*Attorney, Agent, or Firm*—Wilkinson, Mawhinney & Theibault

[57] ABSTRACT

The invention relates to an automatic slack adjuster for maintaining a constant slack in a vehicle brake mechanism. The brakes are applied by turning a key flat carried by a key shaft, said key flat acting upon a pair of telescopically displaceable elements the length variations of which are synchronized. A spring member secured to the key shaft actuates the relative displacements of the elements.

3 Claims, 4 Drawing Figures

AUTOMATIC SLACK ADJUSTER

This invention relates to an automatic slack adjuster for maintaining a predetermined slack in a brake force transmission comprising a key shaft carrying an angularly movable key flat arranged between two compression force transmitting elements adapted to be moved in the direction away from each other upon turning of said key flat during brake application, each of said compressing force transmitting elements being designed as a sleeve threaded on a bolt, the two sleeves engaging said key and being interconnected via a gear wheel journalled coaxially with said key shaft a spring engaged latch being provided to engage a toothed surface on one of said sleeves to rotate said one of the sleeves in case the angular movement of the key shaft exceeds a predetermined angle.

Hitherto it has been common practise to mount said latch on an element which is stationary or angularly movable through a predetermined angle relative a stationary part of the brake—e.g. a backing plate on which the brake shoes of the brake are pivotally mounted. Such known designs are complicated to mount in case of after market sales and need careful check-up of the device after the installation has been completed.

It has also been proposed to mount the latch on a flange of the key shaft near the backing plate. However, it has not been possible to give the latch of this design the necessary mechanical properties, and the mounting and inspection of the latch has been difficult to realize.

The object of the present invention is to provide a slack adjuster of the above type which may be installed without any particular measurements or check-up regardless of the installation being as original equipment or as a result of an after market sale.

According to the present invention this is obtained thereby that said spring engaged latch is designed as a disc spring mounted at the end surface of said key shaft, said disc spring carrying an axially protruding stop member adapted to resiliently engage said toothed surface.

Figure 2:
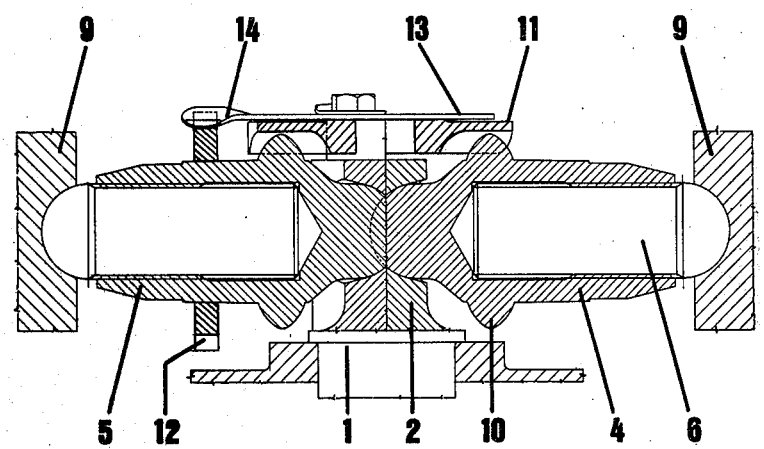
Figure 3:
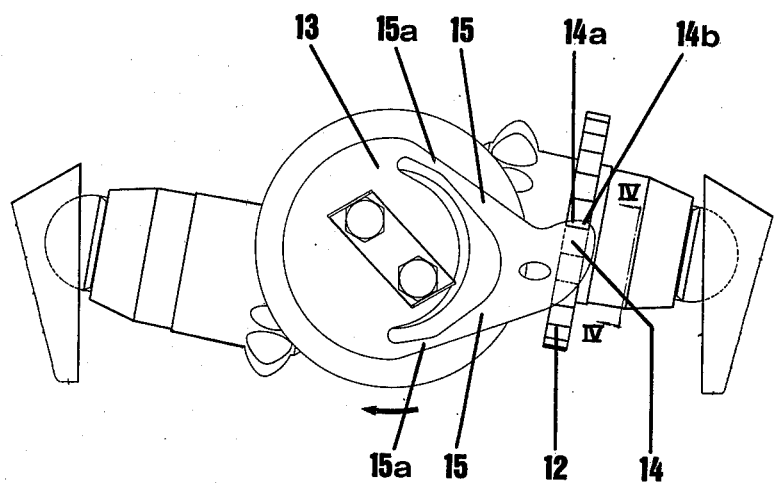
Figure 4:
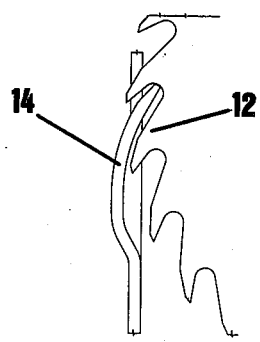

The invention will be described in more detail reference being made to the drawing in which FIG. 1 is a side view of a slack adjuster according to the invention, FIG. 2 is a sectional view along the line II—II of FIG. 1, FIG. 3 is a side view from the side opposite to that of FIG. 1 and FIG. 4 shows a detail of the adjuster in the direction IV—IV of FIG. 3.

Referring first to FIG. 1 the adjuster shown comprises a key shaft 1, adapted to be activated to angular movements by a lever (not shown). The key shaft 1 carries a key flat 2 provided with cavities at both sides from receiving spherical ends 3 of a pair of sleeves 4, 5 receiving threaded bolts 6, 7 having spherical outer ends 8 adapted to engage the upper ends of a pair of braking pads 9. The two sleeves 4, 5 are each provided with a circumferentially extending row of teeth 10 engaging a common gear wheel 11 journalled on the end of the key shaft 1 (as shown in FIG. 2). The sleeve 5 forms the hub of a gear wheel 12 adapted to be activated as described below.

The function of the adjuster device so far described and shown in FIG. 1 is as follows:

During brake application the key shaft 1 is turned in the direction shown by an arrow in FIG. 1. Hereby the key flat 2 will move the sleeves 4, 5 as well as the bolts 6, 7 outwardly and cause a movement of the brake pad ends 9 away from each other into engagement with braking surfaces, not shown. The bolts 6, 7 are locked against rotation around their axis relative to the brake pad ends 9 by means not shown, and it will be understood that rotation of the sleeve 5 in one direction will cause an increase of the total length of the force transmitting element consisting of the sleeve 5 and the bolt 7. Any rotation of the sleeve 5 will cause a corresponding rotation of the sleeve 4 due to the interconnecting gear wheel 11. The teeth of the gear wheel 11 has substantially involute shape and the teeth 10 are elliptical thus allowing rotation of the key flat 2 and outward travel of the teeth 10 in the wheel 11 without resistance.

The gear wheel 12 is adapted to transmit any adjusting movements of the slack adjuster as will be described with reference also to FIG. 2 and FIG. 3.

The end surface of the key shaft 1 carries a disc spring 13 having a stop member 14 protruding radially and axially relative to the remaining disc parts. Said stop member 14 is carried by two legs 15 each having a part 15a thereof shaped to obtain increasing stiffness in the direction from the stop member 14. The legs 15 are diverging in the direction from the stop member 14 and thus it is obtained that the stop member 14 is able to transmit a substantial force in the tangential directions of the disc spring 13 without greater deformations whereas the stop member 14 may be displaced in the direction of the key shaft axis through a substantial distance even when exposed to a minor force.

The stop member 14 engages the teeths of the gear wheel 12 and acts as a spring loaded latch transmitting movements to the sleeve 5 only in the slack take-up direction.

During operation of the brake it may happen that due to excessive slack between the braking surfaces the rotation of the key shaft 1 may exceed the maximum angle normally obtained during a brake application. Such excessive movement of the key shaft 1 will cause a part 14a of the stop member 14 to slip over the edge of a tooth of the gear wheel 12. During the following brake release movement of the key shaft 1 another part 14b of the stop member 14 will contact a tooth flank of the gear wheel 12 and cause a rotation of the two sleeves 5 and 4 in the slack take-up direction.

It will be understood that as long as the relative movements between the stop member 14 and the gear wheel 12 are smaller than the distance between two neighbowing teeth on the gear wheel 12 there will be no adjustment movements of the automatic adjusting device. However, as soon as the said relative movements exceed said distance the sleeves 5 and 4 will be moved angularly corresponding to the angular distance between two neighboring teeth of the gear wheel 12.

Movements of the slack adjuster are only allowed in the slack take-up direction. If the slack is to be increased—e.g. for fitting new brake linings—the stop member 14 may be manually removed from contact with the gear wheel 12 and it will then be possible to turn the two sleeves 4 and 5 manually—e.g. by turning the wheel 11.

The part 14a of the stop member 14 may be rather thin and thus able to determine the limit for angular displacement of the key shaft 1 with great accuracy. The part 14b of the stop member may be worn during operation of the device without influencing upon the accuracy of the adjuster.

As shown in FIG. 4 the teeth of the wheel 12 are substantially undercut. This will have the effect that in case of a very powerful braking during which the stop member part 14a at the end of the braking stroke just passes the top of one tooth, the part 14b will not engage the wheel 12 between two tops of the teeth until at least a part of the return stroke of the brake has been performed. During said first part of the return stroke the brake force transmitted will decrease rapidly and during the subsequent part of the return stroke the force transmitted between the parts 4 and 6 has decreased to such extent that the resistance offered by the wheel 12 does not exceed the force which the stop member 14 is able to transmit.

I claim:

1. An automatic slack adjuster for maintaining a predetermined slack in a brake force transmission comprising a key shaft carrying an angularly movable key flat arranged between two brake shoe engaging compression force transmitting elements adapted to be moved in the direction away from each other upon turning of said key flat during brake application, each of said compression force transmitting elements being designed as a key engaging sleeve part threaded on a brake shoe engaging bolt part, the parts of each element engaging said key being interconnected via a gear wheel journalled coaxially to said key shaft, a spring disc being provided to engage a toothed surface on said sleeve to cause rotation of the interconnected parts of the said elements in case the angular movement of the key shaft exceeds a predetermined angle, characterised in that said spring engaged disc is designed as a spring mounted on the end surface of said key shaft adjacent to said gear wheel, said spring carrying an axially protruding stop member adapted to resiliently engage said toothed surface and to slide on said toothed surface on one of said parts in case of relative angular displacement of the gear wheel and the force transmitting elements.

2. A slack adjuster according to claim 1, characterised in that said stop member is carried by two legs diverging from said stop member and extending in a plane perpendicular to the axis of the key shaft, parts of said legs extending from said stop member towards the axis of the key shaft having increasing stiffness against deformation in the axial direction.

3. A slack adjuster according to claim 4, characterised in that said stop member is provided with an edge adapted to pass the tops of the teeth of the toothed surface of said one of the sleeves and with a contact surface remote from said edge to engage the tooth flanks of the teeth of the toothed surface during adjustment movements.

* * * * *